United States Patent [19]

Applequist

[11] 3,864,750

[45] Feb. 4, 1975

[54] CANTILEVERED ROTARY ACCESS MECHANISM ARMS FOR MAGNETIC DISK SYSTEM

[75] Inventor: Roy Applequist, Redwood City, Calif.

[73] Assignee: Storage Disk Corporation, Louisville, Colo.

[22] Filed: Oct. 19, 1973

[21] Appl. No.: 407,886

[52] U.S. Cl. .................... 360/105, 360/98, 360/103

[51] Int. Cl. .................... G11b 5/54

[58] Field of Search .................... 360/98, 103, 105

[56] References Cited

UNITED STATES PATENTS

| | | | |
|---|---|---|---|
| 3,071,773 | 1/1963 | Haughton et al. | 340/174.15 |
| 3,529,301 | 9/1970 | Hirurz | 340/174.15 |
| 3,702,997 | 11/1972 | Jamieson | 340/174.15 |

*Primary Examiner*—Vincent P. Canney
*Attorney, Agent, or Firm*—Woodcock, Washburn, Kurtz & Mackiewicz

[57] ABSTRACT

A magnetic disk system includes four packs of magnetic disks with a single rotary access mechanism in the middle of the packs. The access mechanism includes positioning rotors stacked on the access mechanism shaft which extends through a central circular opening in each rotor. Each rotor has four rigid arms with the access mechanism shaft extending through a central circular opening in each rotor. The rigid arms are integrally formed with each positioning rotor and one arm extends between adjacent disks of each pack. Magnetic heads are mounted in pairs at the extremity of each arm with a coil spring disposed between each pair of heads. The coil spring provides the sole loading of the heads on the surface of the disk because the entire mass of the rigid arm is cantilevered from the rotor and none of the arm mass bears on the magnetic disk.

1 Claim, 4 Drawing Figures

CANTILEVERED ROTARY ACCESS MECHANISM ARMS FOR MAGNETIC DISK SYSTEM

BACKGROUND OF THE INVENTION

This invention relates to magnetic disk subsystems and more particularly to a cantilevered magnetic head arm in a rotary access mechanism.

Rotary access mechanisms are known for use in magnetic disk systems. Examples are shown in U.S. Pat. Nos. 2,800,642, 3,349,381, 3,412,386 and 3,449,734.

A recently developed high capacity magnetic disk subsystem includes four magnetic disk packs mounted in a common base plate with their axes parallel to one another. Each pack includes a number of magnetic disks mounted on a spindle. A rotary access mechanism is positioned in the center of the four disk packs. This rotary access mechanism concurrently rotates arms carrying magnetic heads into read/write relationship with the corresponding tracks on disks of all four packs. Such a system is described in the copending application of Ivan Pejcha, MULTIPLE PACK MAGNETIC DISK SYSTEM, Ser. No. 364,950, filed May 29, 1973.

Head loading is a problem in magnetic disk systems. Recently the trend has been toward lightly loaded heads and it is difficult to obtain accurate tracking of the head around the disk while still maintaining a light loading on the head.

SUMMARY OF THE INVENTION

In accordance with this invention the loading of the magnetic heads on magnetic disks is provided solely by coil springs between pairs of the magnetic heads. The pairs of heads are supported at the extremities of rigid rotary access mechanism arms. The arms are cantilevered from the positioning rotor in such a manner that their weight is born only by the positioning rotor and none of the access mechanism arm weight is imparted to the magnetic heads.

DESCRIPTION OF THE DRAWINGS

FIG. 3 is a cross section of the rotor, arms and shaft.

DESCRIPTION OF THE PREFERRED EMBODIMENT

Figure 1:
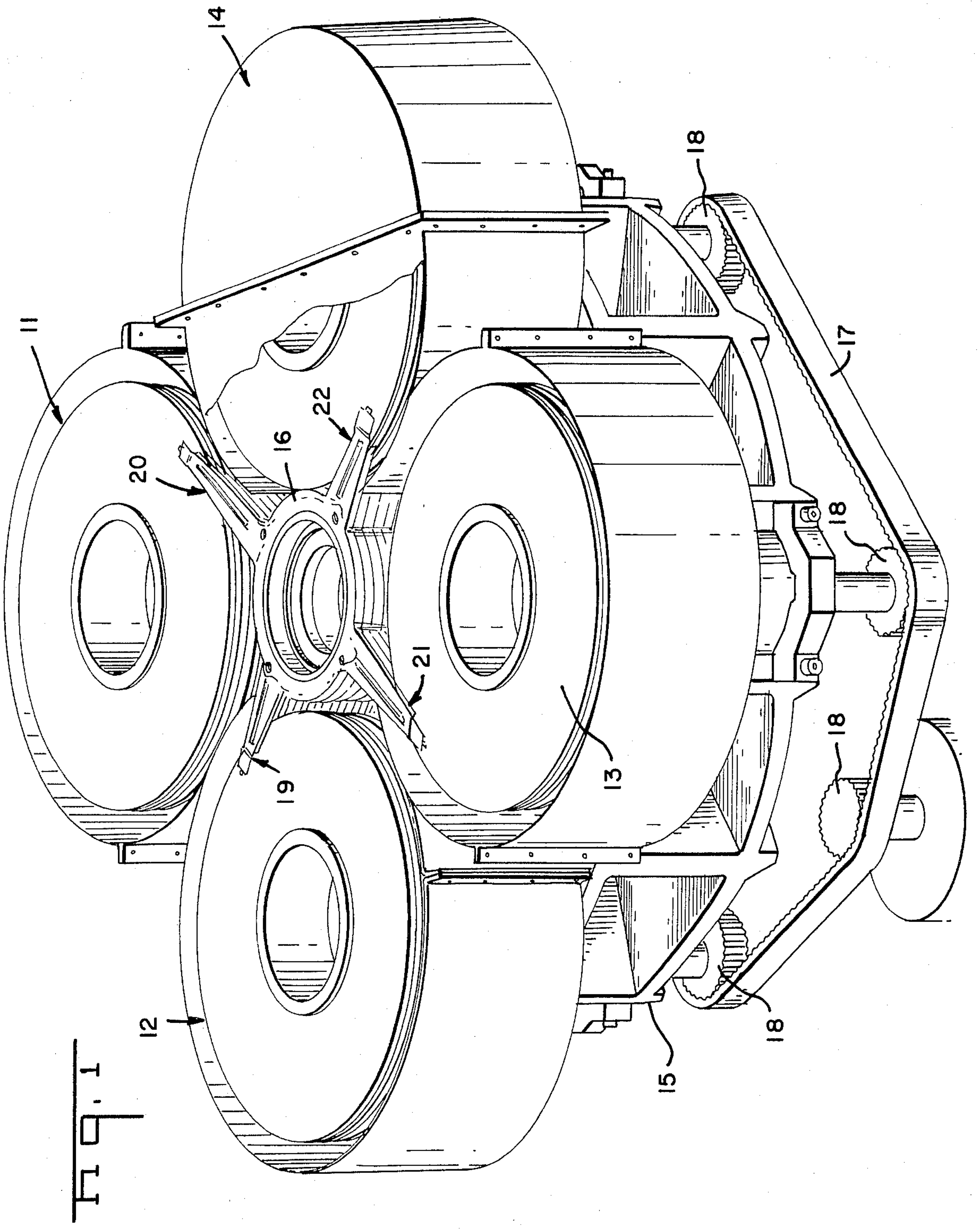
FIG. 1 is a perspective view of the magnetic disk subsystem.
Figures 2, 2A:
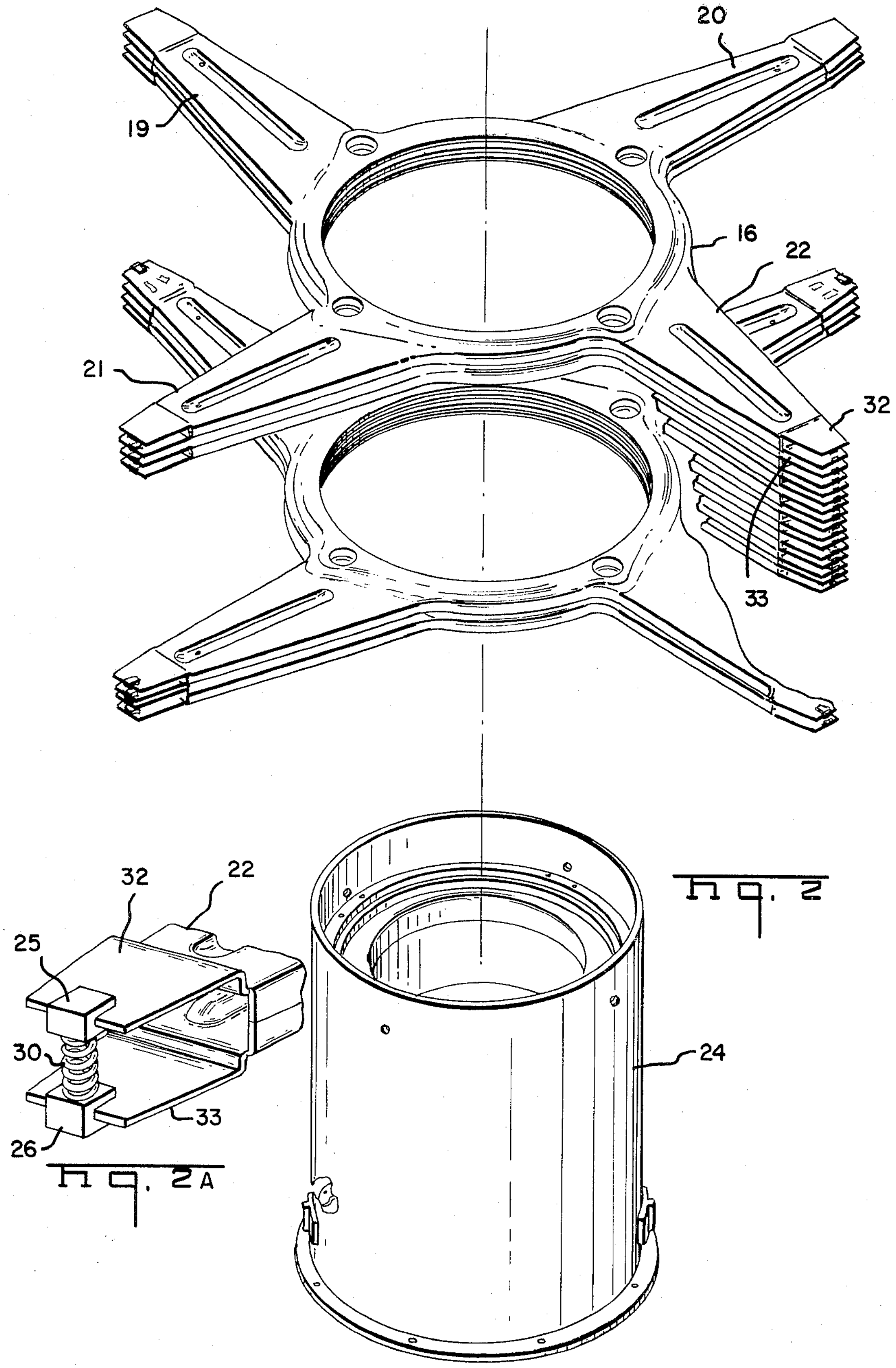
FIG. 2 shows the access mechanism shaft, rotors and arms in more detail.
FIG. 2A shows the head mount.
Figure 7:
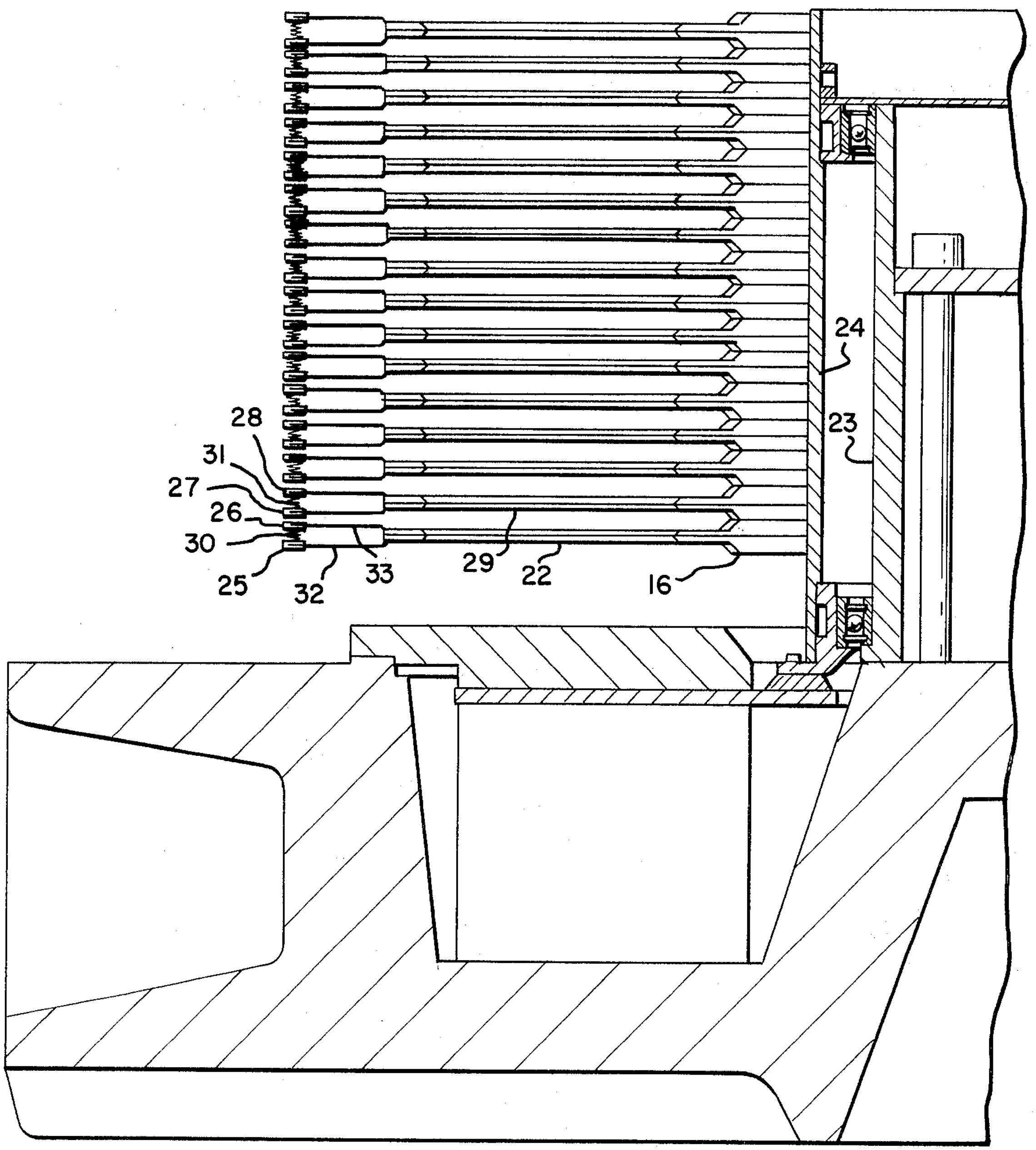

The magnetic disk subsystem of this invention includes four magnetic disk packs 11, 12, 13 and 14 mounted with their axes parallel to one another on base plate 15. A rotary access mechanism including positioning rotor 16 concurrently rotates magnetic heads into read/write relationship with the corresponding tracks on disks of all four packs 11–14.

A timing belt 17 interconnects a drive motor 18 with the spindles of the four packs 11–14. The timing belt has teeth that match with timing pulleys 18 and provides a nonslipping drive connection between all four spindles so that the relative angular position does not change.

Each of the positioning rotors 16 has four integrally formed arms, with the top rotor having the arms 19, 20, 21 and 22. One arm extends between adjacent disks of each disk pack. Each of the positioning rotors has a central circular opening through which the access mechanism shaft 23 extends. Each of the rotors is mounted on the sleeve 24. The assembly is bonded together onto the sleeve.

As the positioning rotors are rotated, magnetic heads mounted at the extremities of the arms are brought into registration with the tracks of the magnetic disk. Pairs of magnetic heads are mounted on each arm. The pair of heads 25 and 26 is mounted on the arm 22. The pair of heads 27 and 28 is mounted on the arm 29 and so on. Coil springs are disposed between each pair of heads to provide the sole loading of the heads on the surfaces of the disks. The coil spring 30 is disposed between the heads 25 and 26. The coil spring 31 is between the heads 27 and 28 and so on.

It is important that the integrally formed arms on each positioning rotor extend almost to the extremity at which the magnetic heads are mounted. Each arm terminates in two sections on which the heads are mounted. For example, the arm 22 terminates in the short sections 32 and 33 which carry the heads. In an actual embodiment of the invention, the positioning rotors and integral arms are stamped from thin gauge stainless steel. This is welded into a light rigid form.

With the head loading provided by the coil springs of this invention, very light head loading can be achieved. For example, head loading on the order of 15 gms is obtainable whereas in the present linear drive head loads on the order of 350 gms were observed. The reason for the heavier loading of prior disk drives is that the mass of the arms themselves was being supported by the heads. Arm resonances sometimes result when the mass of the arm is born by the head and this is a problem. On the other hand, in accordance with the invention none of the arm mass is supported by the head. All of the mass is cantilevered from the rotor.

While a particular embodiment of the invention has been shown and described, various modifications are within the true spirit and scope of the appended claims.

What is claimed is:

1. In a magnetic disk subsystem of the type including:

a plurality of packs of magnetic disks, each pack of disks being mounted on a spindle, said packs being disposed with the spindles parallel to one another and with the edges of the disks in adjoining packs in close proximity one to the other, a rotary access mechanism shaft mounted parallel to, and in the middle of said spindles, and magnetic heads carried into read/write relationship with the tracks of each pack of magnetic disks, the improvement comprising:

a plurality of positioning rotors, each having a central circular opening through which said access mechanism shaft extends, said positioning rotors being stacked on said shaft, a plurality of rigid arms integrally formed with each positioning rotor, said arms extending between adjacent disks of each pack and terminating in a pair of opposing flexible members, each flexible member having disposed thereon a magnetic head; and a plurality of coil springs, one of said coil springs being disposed between the flexible members of each arm in a compressed state for urging the heads apart to provide the sole loading of the heads on the surfaces of said disks.

* * * * *